(12) United States Patent
Pechter

(10) Patent No.: US 6,272,761 B1
(45) Date of Patent: Aug. 14, 2001

(54) TAPE MEASURE FOR BRA SIZING

(76) Inventor: Edward A. Pechter, 25880 Tournament Rd., #217, Valencia, CA (US) 91355

( * ) Notice: Subject to any disclaimer, the term of this patent is extended or adjusted under 35 U.S.C. 154(b) by 0 days.

(21) Appl. No.: 09/430,958

(22) Filed: Nov. 1, 1999

(51) Int. Cl.$^7$ ................ A41H 1/02; G01B 3/10
(52) U.S. Cl. ............ 33/512; 33/494; 33/17 R; 33/759
(58) Field of Search ............ 33/512, 483, 493, 33/494, 2 R, 17 R, 755, 759, 679.1

(56) References Cited

U.S. PATENT DOCUMENTS

| | | | |
|---|---|---|---|
| 2,575,343 | * 11/1951 | Heiman | 33/512 |
| 2,946,125 | * 7/1960 | Gittelson | 33/2 R |
| 3,292,261 | * 12/1966 | Hayes | 33/512 |
| 3,685,155 | * 8/1972 | Oblander | 33/755 |

FOREIGN PATENT DOCUMENTS

1490325 * 7/1967 (FR) ................ 33/512

* cited by examiner

*Primary Examiner*—Christopher W. Fulton
(74) *Attorney, Agent, or Firm*—Roger A. Marrs

(57) ABSTRACT

A tape measuring device for the direct measurement to determine cup size of the breast which includes using an elongated flexible measuring tape for band size measurement by initially measuring the user's girth circumference with the flexible tape measure immediately below the breasts followed by adding five inches to the measured number and incorporating conventional round off procedures. Cup size is determined by directly measuring with the same flexible tape measure of the circumference of each unclothed (bare) breast from the beginning of the breast mound at one side laterally to the parasternal area medially. Next, a measurement conversion is made wherein a measurement of seven inches corresponds to an "A" size cup, eight inches a "B" size cup, nine inches a "C" cup, etc. Each one inch increment determines a cup size.

2 Claims, 1 Drawing Sheet

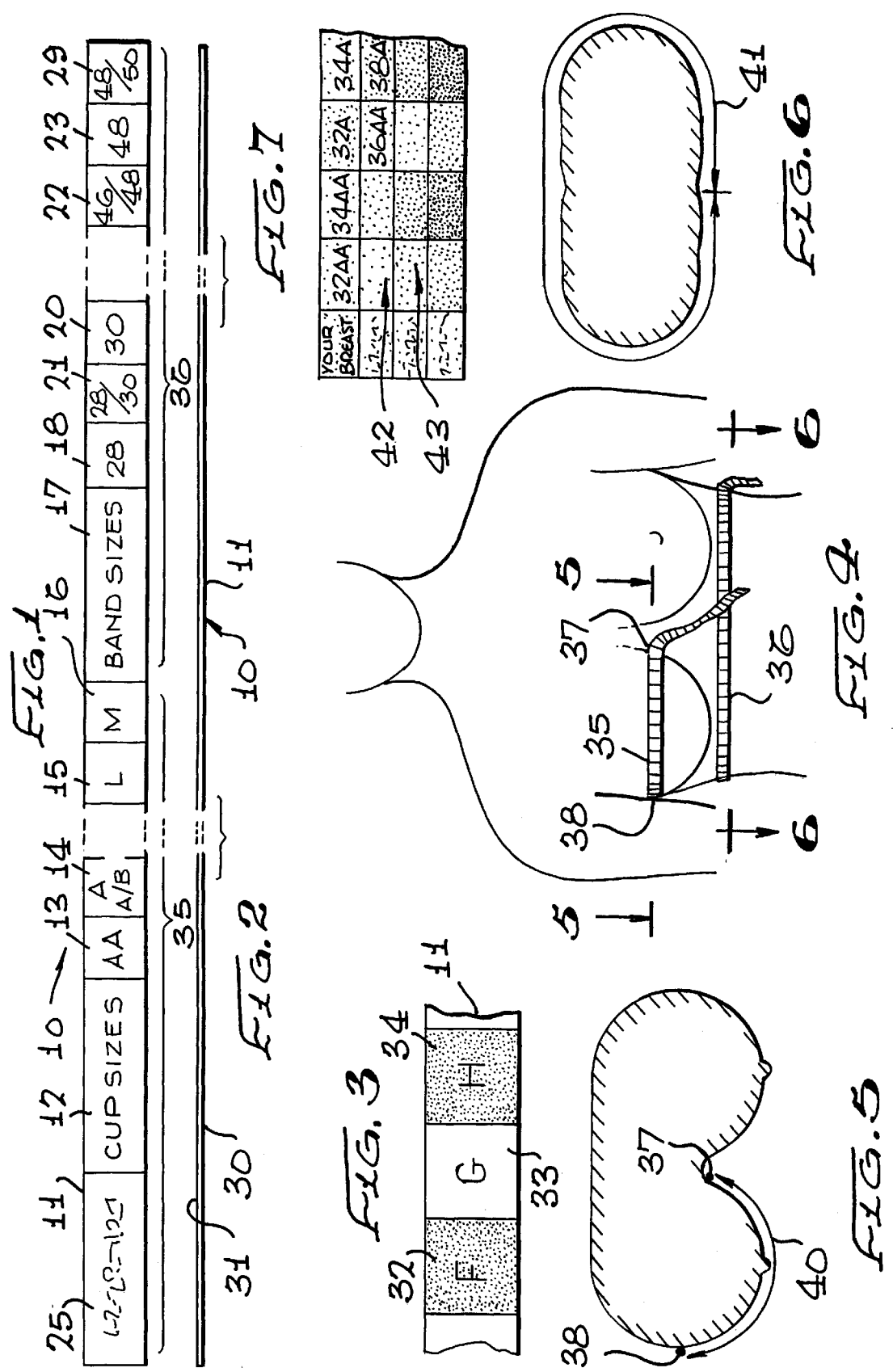

TAPE MEASURE FOR BRA SIZING

BACKGROUND OF THE INVENTION

1. Field of the Invention

The present invention relates to the field of medical procedures and apparatus, and more particularly to a novel tape measuring device for determining bra size of a woman's breast by direct measurement of the breast.

2. Brief Description of the Prior Art

It is often reported that 70% or more of women wear the wrong size bra. It appears that the current method or procedure of determining women's bra size is unreliable a majority of the time. The traditional method of bra measurement is complicated and often yields an improper size which does not correlate to a woman's correct and proper cup size. Improper size renders the wearing of such a bra uncomfortable and may cause other medical problems. Specifically, conventional bra size is determined by two measurement factors such as the "band size" and "cup size".

The band size is expressed numerically while the cup size is represented by a letter such as A, B, C, etc. Band size is determined by measuring the wearer's chest circumference snugly with an incremented tape immediately below the breasts and around the torso. Then five inches is added to the chest circumference measurement. If the sum is an odd number, the sum is rounded to the next highest even number since bras are offered in "even" numbered sizes. Although band size relates to cup size and may continue to be included in a measurement procedure, only the cup size measurement is considered obsolete. The determination of band size is relatively objective compared to the usual subjective method of determining cup size.

The traditional method of determining cup size does not rely on direct measurement of the breast but instead relates to measurement of the circumference of the chest or torso immediately below the breast, sometimes referred to as chest circumference, diaphragm size or body size, etc., to the circumference of chest around the fullest part of the breasts sometimes referred to as bust measurement, cup size, bust size, breast size or bosom. Cup size is determined by comparing band size with bust measurement, the latter being determined by measuring the circumference of the chest loosely with a measuring tape around the fullest part of the breasts, usually at the level of the nipples, with the woman wearing a bra. A difference of one inch equals an A cup, two inches a B cup, three inches a C cup, and so on.

It appears that the goal of the conventional method of determining bra measurement seems to be to determine cup size by comparing the circumference of the chest at the level of the breasts to the same measurement excluding the breasts. Since the latter measurement cannot be made directly, the addition of five inches to the underbust measurement represents an extrapolation or "fudge factor" to approximate that goal.

To compensate for measurement or extrapolation error, elastic is placed in the band of the bra as well as adjustable attachment means which are used to connect the opposite ends of the bra band together. Separate elastic compensating tabs or extensions are used to extend the length of the bra and in some instances multiple rows of attachment loop and hooks are employed to achieve compensation.

Therefore, a long-standing need has existed to provide a new device such as a measuring tape for determining proper bra size by utilizing direct breast measurement techniques, especially the technique of determining cup size by measuring the circumference of an unclothed breast.

One attempt to provide a bust measurement device is disclosed in U.S. Pat. No. 2,946,125 which pertains to a harness-type apparatus having an adjustable horizontal measuring tape or strip and at least a pair of vertically disposed measuring tapes or strips that are trained through spaced-apart slots in the horizontal tape. The device is not believed to be pertinent since no attempt is made to measure band, chest or torso size or girth as a necessary measurement to be used with breast measurement in order to determine cup size. Also, the device requires that the user wear the device while measurement is being taken.

A further need besides the method of measurement resides in a device such as a tape measure that can be used in performing the measurement. Preferably, the tape measure is not to be worn or strapped to the person but should be used only during a measurement procedure.

SUMMARY OF THE INVENTION

The above problems and difficulties are avoided by the novel method of direct measurement to determine cup size of the breast. The method includes band size measurement by initially measuring the user's chest or torso circumference with a tape measure immediately below the breasts followed by the step of adding five inches to the measured number and incorporating conventional rounding off procedures. Next, cup size is determined by directly measuring with a flexible tape measure the circumference of each unclothed (bare) breast from the beginning of the breast mound at one side laterally to the parasternal area medially. In some instances, measurements are taken while the woman is standing and in other instances, the woman is in a supine position. Next, a measurement conversion is made wherein a measurement of seven inches corresponds to an "A" size cup, eight inches a "B" size cup, nine inches a "C" cup, etc. Each one inch increment determines a cup size.

In one form of the invention, an elongated flexible strip of material is provided having a fixed length and width with a front surface and a back surface. A plurality of measurement indicia is carried and displayed on the front surface relating to different categories for determining bra size. A portion of the indicia representing cup size is carried on a first section of the strip front surface while another portion of the indicia representing band size is carried on a second section of the strip following the first section. The indicia for cup size and band are contained within a series of blocks defined by transverse parallel lines across the width of the strip front surface. The indicia takes the form of alpha/numeric notation as well as combinations thereof and may include graphic representations. The back side includes a soft skin compatible texture which is used in an ambient environment so as not to be neither too warm nor too cool for placement next to the skin of a person whose measurements are being taken.

Therefore, it is among the primary objects of the present invention to provide a novel measuring device for bra size determination which employs direct measurement of the breast while the breast is in an unclothed condition.

Another object of the present invention is to provide a novel method for determining bra size wherein the measuring of the breast is done with an incremented tape for determining the circumference of an unclothed breast from the beginning of the breast mound laterally to the parasternal area medially.

Another object of the present invention is to provide a novel method of determining cup size by comparing the measurement of an unclothed breast to bust measurement.

Still a further object of the present invention is to provide a novel method of determining cup size by directly measuring breast circumference in inches and converting the measurement to an alphabetic indication wherein each one inch of measurement increment determines a cup size up or down.

Therefore, it is among the primary objects of the present invention to provide a novel measuring device for bra size determination which employs direct measurement of the breast while the breast is in an unclothed condition.

Another object of the present invention is to provide a novel measuring device for determining bra size wherein the measuring of the breast is done with an incremented tape for determining the circumference of an unclothed breast from the beginning of the breast mound laterally to the parasternal area medially.

Still a further object of the present invention is to provide a novel tape measuring device for determining cup size by directly measuring breast circumference in inches and converting the measurement to an indication wherein each one inch of measurement increment determines a cup size up or down and wherein the inch indicia is in numeric notation and the converted indication is in alphabetic notation.

Another object resides in providing a measuring tape for bra size determination which corresponds to a woman's own estimation of cup size and which makes the purchase of a brassiere simpler and more accurate as well as providing plastic surgeons a means to communicate more effectively with patients undergoing breat augmentation and reduction surgery.

A further object resides in providing a measuring tape having indicia pertaining to breast cup and torso girth size so as to provide a direct reading or indication for bra sizing.

Another object of the invention is to provide a novel measuring tape for use in bra sizing that includes a series of alpha/numeric indicia intended to provide direct measurement readings of both bra cup and band size.

Another object resides in a tape measuring device that is comfortable for use against the unclothed skin of a woman undergoing measurement for bra size determination.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a layout view of the novel measuring tape incorporating the direct reading indicia for bra size determination employing the present invention;

FIG. 2 is a top plan view of the measuring tape;

FIG. 3 is an enlarged fragmentary view illustrating both color and alpha indicia on a portion of the measuring tape;

FIG. 4 is a diagrammatic view showing the measuring tape of FIGS. 1–3 inclusive being used in a bra sizing procedure.

FIG. 5 is a diagrammatic sectional view of the measuring tape used in determining bra cup size as taken in the direction of arrows 5—5 of FIG. 4;

FIG. 6 is a view similar to the view of FIG. 5 showing the measuring tape used for determining band size, and FIG. 7 is a fragmentary view similar to FIG. 3 illustrating cup size in rows and columns.

DESCRIPTION OF THE PREFERRED EMBODIMENT

Referring to FIG. 1, the novel measuring tape of the present invention is illustrated in the general direction of arrow 10 which includes a length or strip of flexible material indicated by numeral 11, which has a fixed length and width. One surface of the tape or strip is employed to carry a plurality of indicia relating to different categories for use in the procedure of determining bra sizes. In order to determine cup size, a portion of the tape includes indicia noting "cup sizes" and that portion of the tape is indicated by numeral 12. Next in a series is a plurality of portions delineated by lines in order to establish a series of blocks in which indicia pertaining to cup sizes is represented. For example, block 13 indicates cup size double A while block 14 indicates A with A/B indicating a half cup size. Additional sizing information may be placed for cup size, such as is shown in blocks 15 and 16 represented by letters L and M for large or medium, if desired.

Continuing along the length of the strip or tape 11, a block 17 is provided with the indicia "band sizes" followed by a plurality of blocks which include numeric information.

For example, block 18 carries the number 28 for 28 inches while block 20 carries the number 30 for 30 inches and block 21 separating block 18 and 20 may be employed for half sizes or intermediate sizes, such as 28/30. Additional blocks 22, 23 and 24 may be employed which display additional numeric information relating to torso girth or band size. The end of the tape, represented by block 25, is used for display of product or manufacturing information. Display block 25 may carry logo, usage information or the like.

Referring to FIG. 2, it can be seen that the tape 11 is very thin and therefore is flexible so that the tape may be draped or trained about the chest or torso of the person being measured as well as about each of the respective breasts of the person. The front side of the tape, as indicated by numeral 30, carries the blocks and alpha/numeric indicia, as shown in FIG. 1, while the back side 31 of the tape 11 bears against the bare body of the person being measured. Therefore, the back side should be smooth and comfortable when placed adjacent the skin of the person being measured.

Referring now in detail to FIG. 3, it can be seen that the blocks shown in FIG. 1 can further be identified by establishing a color coding indicator. For example, the block 32 containing the letter F may be of one color while the adjacent block 33 containing the letter C may be of a different color, while the next block 34 in the series may be of the same color as block 32 or may be of a different hue or color. Block 34 displays the letter H.

Referring now in detail to FIG. 4, in actual use in order to determine cup size, a mark is made at the outer and the inner extent of each breast. Using the first part of the tape measure between those marks across the fullest part of the breast, usually at the level of the nipple, the end of the tape is placed at the outer mark and then extended across the breast at the nipple to terminate at the inner mark. A direct reading is then taken from the tape which will provide cup size. In small or firm breasts, cup size can be measured with the individual standing whereas in large breasts, it is more accurately determined while the individual is lying down. To complete cup sizing, add half a cup size for every band size decrement below the numeral 36. Subtract half a cup size for every band size over the numeral 36.

With respect to band size, place the tape around the chest directly under the breast to obtain a band size utilizing the scale displayed by the numeral blocks in the second part of the tape.

As noted in FIG. 1, the first part of the tape relating to cup size is indicated by numeral 35 while the second half of the tape relating to band size is indicated by numeral 36. These numbers are carried over into the description of FIG. 4 wherein cup size is being determined by the first half or display section of the tape 35 while the girth of the torso is being measured to determine band size by the second part or display section of the tape indicated by numeral 36. These determinations are shown in FIGS. 5 and 6 as well wherein it can be seen that an inner mark 37 is used in FIG. 5 to establish one end of the measurement while an outer mark 38 indicates the other end of the measurement. Therefore, the distance between inner and outer marks 37 and 38 across the nipple of the breast determines cup size in a direct reading and the arrow 40 indicates the measurement distance between marks 37 and 38.

With respect to band size shown in FIG. 6, tape 10 is trained around the torso or chest of the person and direct reading in terms of inches or numeric information is derived. It is mandatory that the measurement be taken immediately under the breasts in order to determine proper band size. Numeral 41 indicates the tape as trained about the chest of the person being measured and where the ends of the tape meet will determine the band size as directly read by blocks having certain numerical data.

In FIGS. 4, 5 and 6, a woman's torso is indicated and it is to be particularly noted that the measurements to be taken are performed about unclothed breasts. The first step in performing the method is to determine proper band size which is determined by measuring the chest or torso circumference immediately below the breasts employing the measuring tape 10, portion 36, which is in increments of numeric display of inches. The tape is placed about the chest in a snug fashion immediately below the breasts. After the measure of increment has been noted, the resultant figure is then tabulated and may be used to determine the length of the bra band. However, in employing the procedure, the resultant measurement need not be used to determine cup size.

In determining cup size, the woman's breast intended to be measured is unclothed and cup size is determined by direct measurement of the bare breast. Each breast is measured separately so that separate tabulation for a cup relating to each breat may be noted. Direct measurement is achieved by measuring with the tape measure 10, portion 35, the circumference of the unclothed breast from the beginning terminating mark of the breast mound as at point or mark 37 laterally across the breast mound at the nipple into the parasternal area medially represented by mark 38. In small or firm breasts, this measure can readily be achieved while the woman is standing, whereas with women having large or ptotic breasts, a more accurate measurement can be achieved with the woman in a supine position. The point where the breast mound begins laterally can sometimes be more easily discerned in a heavy woman with her arms elevated. A measurement of seven inches corresponding to an "A" cup may be a conversion factor. Likewise, a measurement of eight inches would represent a "B" cup while nine inches represents a "C" cup and so on up and down the measurement line with each one inch increment determining a cup size up or down. By employing the tape 10, the cup size is directly determined in terms of alpha data as opposed to numerical data for determining cup size.

Therefore, it can be seen that the inventive method provides a single measurement for determining cup size and that the measurement is direct in reading for each breast separately and that measurement is extremely convenient, accurate and would be of great help to plastic surgeons by affording them the opportunity of better meeting the expectations of women undergoing breast augmentation or reduction surgery. The measurement is extremely useful for women who wish proper bra sizing since the current popular and traditional system of determining bra size is so often inaccurate as to be practically useless. The improved method and measuring tape of the present invention of determining cup size by directly measuring the circumference of the breast itself is accurate and provides a cup size which will insure comfort and convenience to the user. If combined with determination of band size by direct correlation with under bust circumference, it is possible to dramatically reduce the number of women wearing the "wrong size bra".

It is to be further noted that a single length of measuring tape is employed for taking all measurements and that the tape is divided into two parts so as to relate the first part to cup size and the second part to band size. The present invention eliminates the need to wear a harness-like apparatus with shoulder and torso bands or straps which are totally unnecessary and undesirable. The tape measure 10 may be drawn from the case or housing to a desired length. Numerical increments in inches or, if desired, millimeters are imprinted or displayed along a selected side of the tape. If desired, a woman may take measurements by herself using a mirror or by visual observation. However, it is recommended that an experienced or trained person assist in measurement.

The plurality of displayed indicia carried on the first and second sections of the strip or tape are defined between a plurality of spaced-apart separation lines. Therefore, a plurality of blocks is established by the separation lines carrying the cup size indicia on the first section or part of the strip while carrying band size indicia on the second section or part of the strip.

The inventive concept includes placing of alpha/numeric notation for cup size in rows 42 and columns 43 along the length of the first section with the smaller sizes across a top row and increased sizes displayed along the lower rows. FIG. 7 illustrates such an arrangement or display. The respective blocks defined between spaced-apart lines or shadow lines may be of different colors or hues with the alpha/numeric indicia carried thereon.

Different methods of use have been devised employing two separate ways in which the first part or portion of the tape is used. The first, and simpler, method is a direct correlation wherein a breast circumference measurement of seven inches corresponds to an "A" size cup, eight inches a "B" size cup, nine inches a "C" size cup, etc. In the second method, the cup measurements are offset a half-size according to the band measurement, to allow for the fact that cup size varies with band size, e.g. the "C" cup of a 36 bra is larger than the "C" cup of a 34 bra yet smaller than the "C" cup of a 38 bra. Conversely, a nine inch breast circumference corresponds to a "C" cup in a bra of band size 36 whereas it would be a "full C" in a bra of band size 34 and a "small C" in a bra of band size 38.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tape measuring device for direct bra sizing including individual breast cup size measurement and band size measurement comprising:

a singly elongated flexible strip having an exposed front surface and a hidden rear surface when bearing against the skin of a user;

said front surface having a first display section abutting with and in series with a second display section;

said first display section carrying a plurality of indicia equated with cup size for single breast measurement extending along said front display surface commencing from a first end of said strip and terminating at said second display section;

said second display section carrying a plurality of indicia equated with bust size for chest measurement extending along said front display surface from said first display section to a second end of said strip;

a plurality of spaced-apart separation lines carried on said front surface separating said indicia into a series of blocks in a continuous series along the length of said front surface between said first end and said second end;

a selected one of said blocks in said first section identifies cup size and a second one of said blocks in said second section identifies band size; and said rear surface is smooth and soft without indicia so as to be compatible with the skin of the user and for direct measurement.

2. A tape measure for direct measuring for bra size comprising:

an elongated stip of flexible material of fixed length and width and having a front exposed surface and a rear hidden surface when against the skin of the user and with said front and said rear surfaces terminating between opposite ends of said strip of flexible material;

said rear hidden surface being of a plain, soft and smooth texture adapted to be comfortably engageable with the sensitive skin of the user;

said front surface bearing visible indicia of alpha/numeric representations relating to different characteristics for determining bra size and having a first section displaying indicia for cup size and a second section coextensive with said first section for displaying band size;

each of said first and said second sections carrying a plurality of spaced-apart vertical lines across said width of said strip defining a plurality of blocks between said vertical lines wherein each block displays said indicia;

said first section includes said indicia for cup size arranged in rows and columns;

said indicia for cup size and said indicia for band size are numeric notation; and said blocks include a background of different hues whereby alternate ones of said blocks are of different hues than said blocks which are adjacent to each other.

* * * * *